United States Patent
Mühlemann (10) Patent No.: US 11,958,221 B2
(45) Date of Patent: Apr. 16, 2024

(54) INJECTION MOLD WITH CENTERING DEVICE

(71) Applicant: FOSTAG Formenbau AG, Stein am Rhein (CH)

(72) Inventor: Rolf Mühlemann, Schlattingen (CH)

(73) Assignee: FOSTAG Formenbau AG, Stein am Rhein (CH)

( * ) Notice: Subject to any disclaimer, the term of this patent is extended or adjusted under 35 U.S.C. 154(b) by 302 days.

(21) Appl. No.: 17/612,840

(22) PCT Filed: May 13, 2020

(86) PCT No.: PCT/EP2020/063255
§ 371 (c)(1),
(2) Date: Nov. 19, 2021

(87) PCT Pub. No.: WO2020/234065
PCT Pub. Date: Nov. 26, 2020

(65) Prior Publication Data
US 2022/0234270 A1    Jul. 28, 2022

(30) Foreign Application Priority Data

May 22, 2019 (CH) .................................. 00662/19
Mar. 4, 2020 (CH) .................................. 00257/20

(51) Int. Cl.
*B22D 17/24* (2006.01)
*B29C 33/30* (2006.01)
(Continued)

(52) U.S. Cl.
CPC .............. *B29C 45/36* (2013.01); *B22D 17/24* (2013.01); *B29C 33/304* (2013.01);
(Continued)

(58) Field of Classification Search
CPC ...... B22D 17/24; B29C 33/304; B29C 33/444
See application file for complete search history.

(56) References Cited

U.S. PATENT DOCUMENTS

| 8,899,962 B2 | 12/2014 | McCready |
| 10,814,538 B2 | 10/2020 | Mühlemann |
| 2019/0283298 A1 | 9/2019 | Mühlemann |

FOREIGN PATENT DOCUMENTS

| DE | 3140711 A1 | 4/1983 |
| EP | 1083035 A2 | 3/2001 |

(Continued)

OTHER PUBLICATIONS

International Search Report dated Aug. 11, 2020 with Written Opinion for PCT/EP2020/063255, filed May 13, 2020.
(Continued)

*Primary Examiner* — Kevin E Yoon
(74) *Attorney, Agent, or Firm* — Paul D. Bianco; Fleit Intellectual Property Law (57) ABSTRACT

An injection mold with a centering device includes a die-holding plate with a cavity-forming die unit, a core-holding plate with a core unit, and a stripping plate between the core-holding and die-holding plates. The centering device has a insert and a mount with a clearance, which is rotationally symmetrical about a center axis and is for receiving the insert. The insert has an opening for receiving the core unit and the insert and the clearance of the mount are insertable in a torsion-free manner in the clearance of the mount in at least three positions rotatable about a center axis of the insert, and the center axis of the clearance and the center axis of the insert overlie one another. A center axis of the opening of the insert is arranged eccentrically in relation to the center axis of the insert by an offset. The centering unit is arranged in the stripping plate.

15 Claims, 4 Drawing Sheets

(51) Int. Cl.
*B29C 45/26* (2006.01)
*B29C 45/36* (2006.01)
*B29C 45/40* (2006.01)

(52) U.S. Cl.
CPC .......... *B29C 45/2602* (2013.01); *B29C 45/40* (2013.01); *B29C 2045/4078* (2013.01)

(56) References Cited

FOREIGN PATENT DOCUMENTS

| | | | | |
|---|---|---|---|---|
| JP | S5120258 | A | 2/1976 | |
| JP | S57-88527 | U | 6/1982 | |
| JP | S60-110417 | A | 6/1985 | |
| JP | H05-88925 | A | 4/1993 | |
| JP | 2001334557 | A | 12/2001 | |
| JP | 2006-327006 | A | 12/2006 | |
| JP | 2010-142989 | A | 7/2010 | |
| JP | 2013-544677 | A | 12/2013 | |
| KR | 101564048 | B1 * | 10/2015 | |
| KR | 20200024512 | A * | 3/2020 | ......... B22D 17/2218 |
| WO | 2017/215801 | A1 | 12/2017 | |

OTHER PUBLICATIONS

International Preliminary Report on Patentability dated Nov. 16, 2021, with Written Opinion for PCT/EP2020/063255, filed May 13, 2020.
Office Action dated Nov. 17, 2023 for Japanese Application No. 2021-569148 (5 pages).

* cited by examiner

INJECTION MOLD WITH CENTERING DEVICE

TECHNICAL FIELD

The invention relates to an injection mold with a centering device, which comprises a die holding plate having at least one cavity-forming die unit, a core holding plate having at least one core unit, which is introduced into the die unit in the closed state of the injection mold, and a stripping plate between the core holding plate and the die holding plate.

TECHNICAL BACKGROUND

During the production of thin-walled, container-like injection-molded articles, particularly cups, tubes, tube heads, vials, bottle blanks or syringes, a uniform wall thickness is of great importance, as even small deviations in the wall thickness during the cooling and removal from the mold of the container may lead to pronounced deformations of the container due to volume shrinkage which occurs.

The cavities for such injection-molded articles are regularly constructed by a die and a core arranged therein. In order to obtain a uniform wall thickness, the position of the core in a separation plane perpendicular to the closing direction of the mold must therefore be aligned such that it is centered with the cavity-forming die. In multi-cavity molds, each core is centered separately in this case. A separate centering of the cores in the respective die is important, in order to obtain injection-molded articles with uniform wall thicknesses with all cavities.

Injection molds known from WO2017215801 for such thin-walled, container-like injection-molded articles, comprise a die holding plate, in which at least one cavity-forming die unit or die is securely held, a core holding plate, on which at least one cavity-forming core unit or a core is held, and a stripping ring, which is arranged in a positive-fitting manner in a recess of the core unit and can be moved counter to the closing direction, in order to strip the finished injection-molded article from the core after the opening of the mold. The core or the core unit is mounted in a floating manner on the core holding plate for setting the centering and is fixed in its position on the core holding plate by means of fastening means once correct centering has taken place.

The core centering device comprises a plurality of—in most cases four—centering strips, which have a centering surface which is inclined compared to the closing direction of the injection mold and are supported on a correspondingly inclined contact surface of the core unit. By adding or removing adjustment films at the centering strips, the core can be centered exactly in the associated die. Each centering strip therefore forms a centering surface on the core unit, which corresponds to a centering surface on the die unit. As soon as the core and die are centered with respect to one another, the core unit is fixed on the core holding plate and the mold is ready for the production of the injection-molded articles. If there are a plurality of core units, air gaps are present between adjacent core units for the individual centering of the individual units.

In a further centering device described in WO2017215801, the stripping ring is held in a floating manner in a stripping plate, which is arranged between die holding plate and core holding plate. The at least one adjustable core centering device is arranged between core unit and core holding plate.

DE3140711 and JPS5120258 in each case describe a centering device, which is based on a circular eccentric plate, in order to set the position of the core relative to the die. A disadvantage of such a centering device is that the circular eccentric plate, which holds the core unit eccentrically, can only be adjusted to the desired displacement of the core with difficultly and must be fixed against rotation by means of set screws. Owing to the set screws, it is additionally not space-saving and operation mostly from the side must be ensured. In addition, the circular disc can displace over time during the operation of the mold, in spite of fixing.

SUMMARY OF THE INVENTION

One aspect of the invention specifies an injection mold with a centering device, which avoids at least a few of the above disadvantages. Another aspect relates to designing the centering device in a more space-saving and simpler manner.

The injection mold comprises a die holding plate having at least one cavity-forming die unit and a core holding plate having at least one core unit, which is introduced into the die unit in the closed state of the mold, and a stripping plate between the core holding plate and the die holding plate. The centering device comprises a centering insert and a centering insert holder having a recess, which is rotationally symmetrical about a central axis MA, for the interchangeable mounting of the centering insert. The centering insert has an opening for mounting the core unit. The centering insert and the recess of the centering insert holder are configured in such a manner that the centering insert can be inserted in the recess of the centering insert holder in a manner secured against rotation in at least three positions that are rotatable about a central axis MB of the centering insert and in this case, the central axis MA of the recess and the central axis MB of the centering insert are superposed. Furthermore, a central axis MC of the opening of the centering insert is arranged eccentrically by an offset with respect to the central axis MB of the centering insert. The at least one centering unit is arranged in the stripping plate.

Molds, injection molds in particular, generally have a plurality of cavities. In order to mold as many articles as possible with each production cycle, these cavities must be arranged as closely as possible in the mold. The described centering device allows such a close packing, because it is simple and space-saving in construction. Production tolerances can therefore be compensated in a simple manner. In injection molds with lateral injection, the respective core units can be aligned with respect to the injection point, so that they are arranged centrally in the die during the injection process.

The centering of the core unit takes place in this case due to the size of the offset of the centering insert and the alignment of the offset when the centering insert is inserted. The core unit is mounted in the opening of the centering insert, which in turn is mounted in a stationary manner and secured against rotation in the recess of the centering insert holder. The direction of the offset is set in that the centering insert is inserted into the mount in one of the at least three rotational positions. Additional means for securing against rotation, e.g. set screws, are not present or rather are not required.

A core unit, which is not correctly aligned in the die, can then be displaced by a desired offset, in that the corresponding centering insert is chosen, the central axis MC of the opening of which is offset eccentrically by just this offset with respect to the central axis MB of the centering insert. The longitudinal direction of the core unit is perpendicular to the offset direction in this case. The direction in which the correction is undertaken is determined by the insertion of the centering insert in one of the at least three positions. A centering insert, the offset of which has a certain size, can therefore be inserted for correcting this offset in the at least three directions. Using a range of centering inserts, which differ only in terms of the size of the offset, all core units can therefore be centered as desired in a simple manner. If the centering of the core unit is not correct after a trial run of the mold, the centering insert can simply be exchanged, in order to obtain the correct centering.

Depending on the requirement, the offset can be 0.01 mm to 0.1 mm. For fine adjustment of the core units of a multi-cavity mold, a set can be manufactured with a multiplicity of centering inserts, with offset steps of 0.01 mm for example. Depending on the correction to be undertaken, a centering insert with the desired offset is chosen, rotated into the correct position and inserted into the centering insert holder. In many cases, centering inserts with an offset of 0.01 to 0.05 mm in steps of 0.01 mm are sufficient.

Further embodiments of the invention are specified in the dependent claims.

In a few embodiments, the centering insert is formed by a stripping element (or a stripping ring) mounted in the stripping plate. The stripping element, which is used when opening the injection mold for stripping the injection-molded article from the core unit, correspondingly has the opening for mounting the core unit. In this case, the core unit can be held in the core holding plate in a floating manner and is centered in the closed injection mold by the stripping element. The centering insert holder is formed directly in the stripping plate or as a separate part mounted in the stripping plate. This embodiment is particularly space-saving, because the stripping element additionally takes on the function of the exact centering of the core unit and thus no additional part is necessary for the centering.

In a few embodiments, the outer contour of the centering insert has the shape of a regular polygon (i.e. a polygon which is both equilateral and equiangular). The inner contour of the recess of the centering insert holder is constructed to be complementary to the outer contour of the centering insert, so that the centering insert can be mounted in a manner secured against rotation in the recess of the centering insert holder. In this case, the central axis MC of the opening of the centering insert is aligned eccentrically by an offset towards the direction of a polygon side or a polygon corner. Depending on the number of side surfaces (polygon sides) or corners (polygon corners) of the regular polygon, the centering unit, which has a symmetrical outer contour, can be rotated into just as many positions. That is to say, a polygon with n side surfaces can be rotated into n different positions. Owing to the outer and inner contour in the shape of a regular polygon, the inserted centering insert is secured against rotation during the use of the mold. Additional securing against rotation is not necessary.

In a few embodiments, the regular polygon can have three to twelve side surfaces or corners. Good results were achieved with a regular 8-gon. Using an 8-gon, eight different offset directions can be set, which in each case corresponds to a step of the offset direction of 45 degrees in each case for a centering insert (in the case of an offset towards polygon side/polygon corner). If two centering inserts are used, once with offset to a polygon side and once with offset to a polygon corner, then even a step of the offset direction of 22.5 degrees is possible.

In a few embodiments, the centering insert comprises a circular cylindrical base body, on the cylindrical surface of which a projection standing perpendicular to the central axis MB of the centering insert, e.g. in the form of a pin, a stud or a bolt, is arranged. The recess of the centering insert holder has a shape complementary to the base body of the centering insert, which has at least three rotationally symmetrically arranged slots running parallel to the central axis MA of the recess for accommodating the projection of the centering insert. The central axis MC of the opening of the centering insert is generally aligned eccentrically by an offset in the direction towards the projection.

In a few embodiments, the core unit can be mounted in the opening in such a manner that a displacement in the longitudinal direction of the core unit is possible. This is the case in particular if the centering device is provided in the die unit and the core unit only dips into the opening when the mold is closed. Also, in molds, particularly injection molds, which have a stripping plate, in the case of a centering unit provided in the stripping plate, the core unit can be mounted in a displaceable manner in the core longitudinal direction in the opening of the centering insert. The mounting in the opening is stationary transversely to the core longitudinal direction, so that an exact centering is possible. The opening for mounting the core unit can be formed cylindrically or conically and may extend substantially over the entire thickness of the stripping plate. The core unit is then accordingly likewise formed cylindrically or conically in this region. In order to reduce possible friction and thus wear of the individual part, the core unit may have a circumferential taper in a central region of the section which is held in the opening in the closed mold. There is no contact with the centering unit in this central region in the closed state. The regions adjoining the central region on both sides contact the centering unit however and fix the core unit at the desired position in the closed state of the mold.

In a few embodiments, the opening may be a through hole (e.g. preferably in the case of use in the core holding plate or stripping plate) or a blind hole (e.g. preferably in the case of use in the die unit). If the centering device is used in the die unit, the core unit is introduced into the opening when the mold is closed. In order to facilitate this introduction and to prevent undesired sticking on the side edges, the opening may be formed conically. Accordingly, the tip of the core unit, which dips into the opening, may also be formed conically.

In a few embodiments, the centering inserts may have a cylindrical shape, e.g. similar to a hexagonal nut, but without an internal thread and with an eccentric bore.

In a few embodiments, the mold can have a plurality of cavities, which are provided with at least one centering unit in each case.

In a few embodiments, a further centering unit can be arranged in the core holding plate and/or the die unit.

In a few embodiments, the centering insert holder can be constructed as a separate part which is mounted in the die unit, the stripping plate and/or the core holding plate.

In a few embodiments, the centering insert holder may be formed by the die unit, the stripping plate and/or the core holding plate.

BRIEF DESCRIPTION OF THE DRAWINGS

The invention shall be explained in more detail in the following on the basis of exemplary embodiments in connection with the drawing(s). In the figures.

DETAILED DESCRIPTION OF EMBODIMENTS

Figure 1:
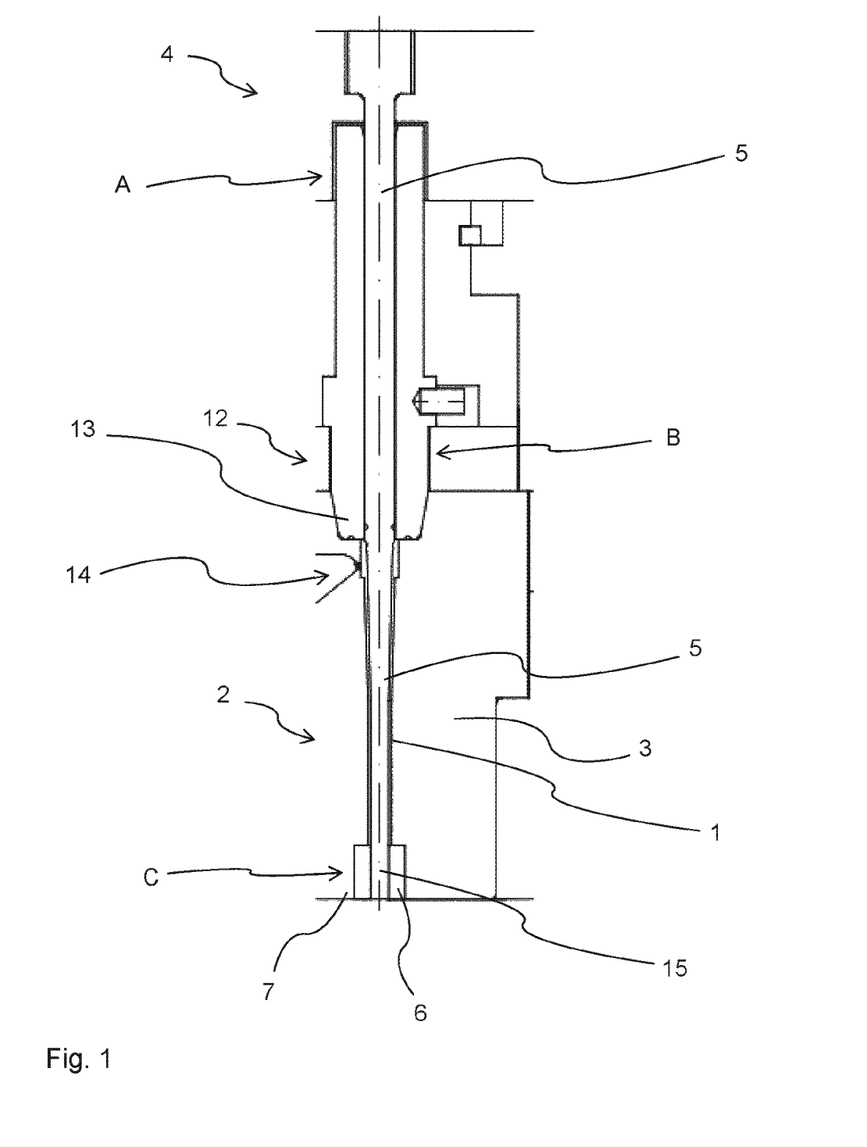
FIG. 1 shows a sectional illustration of a cutout of an injection mold with a centering device.

FIG. 1 shows a sectional illustration of a cutout of an injection mold with at least one cavity 1 for a thin-walled, elongated injection-molded article. The injection mold comprises a core holding plate 4, in which at least one cavity-forming core unit 5 is held, and a die holding plate 2, in which at least one cavity-forming die unit or die 3 is held. Furthermore, between the core holding plate 4 and the die holding plate 2, the injection mold comprises a stripping plate 12, in which a stripping element or stripping ring 13 is held. In the injection mold shown, the injection takes place via an injection channel 14 arranged laterally with respect to the core unit 5.

Figure 2:
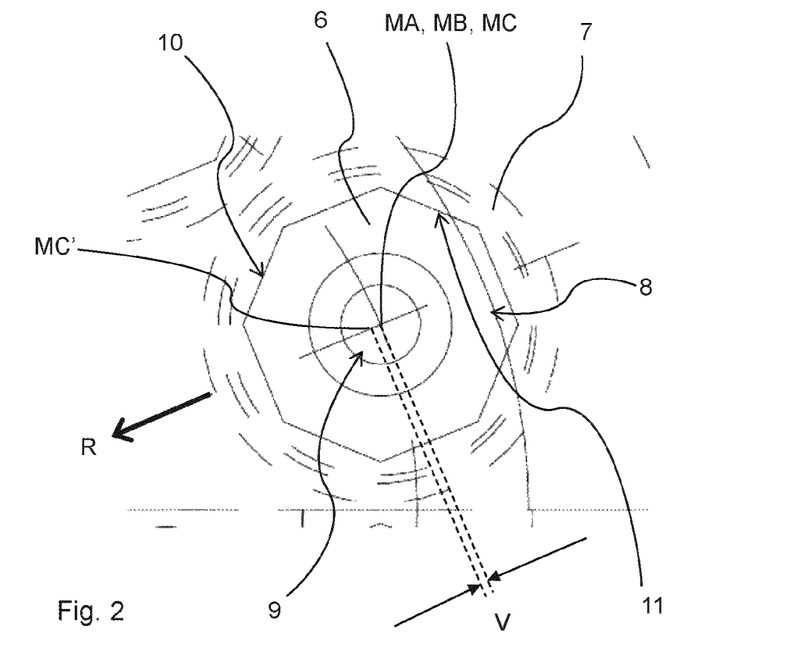
FIG. 2 shows a centering device in the shape of a regular 8-gon.

FIG. 2 shows a centering device for centering a core unit in a mold. The centering device comprises a centering insert 6 and a centering insert holder 7. The centering insert holder 7 forms a recess 8 for precise mounting of the centering insert 6. The recess 8 is formed rotationally symmetrically to a central axis MA. In the embodiment shown, the recess 8 has an inner contour 11 in the shape of a regular 8-gon. The centering insert 6 is rotationally symmetrical to a central axis MB and in cross section (sectional plane perpendicular to the longitudinal axis of the core unit or to the central axis MB) has a complementary outer contour 10 to the inner contour 11 of the recess 8, in the shape of a regular 8-gon. Furthermore, an opening 9 for the core unit (not illustrated) is formed in the centering insert 6, in which the core unit is held in a precisely fitting manner so as to be displaceable or non-displaceable in the longitudinal direction. In the illustration shown, the central axis MC of the opening 9 is formed exactly centrally to the outer contour without offset, i.e. the central axis MC of the opening 9 overlays the central axis MB of the centering unit 6. In the inserted state of the centering unit 6 in the centering insert holder 7, the central axis MB of the centering unit 6 overlays the central axis MA of the recess 8 of the centering insert holder 7.

A core unit, which is not exactly centered in the cavity or the die unit owing to production tolerances, can be centered using a correcting centering insert 6. To this end, the central axis MC of the opening 9 of the centering insert 6 is constructed to be offset by an offset V, usually in the range of a few hundredths of a millimetre, in the direction R towards a side surface (or a corner) of the 8-gon. Using a centering insert 6 with eccentric opening 9, the position of the core unit with respect to the die/cavity can then be corrected by the offset V in eight different directions. Should the size of the offset or the direction of the offset not be correct in the inserted state (which can be determined by means of a trial run of the mold), the centering insert 6 can simply be rotated or replaced by a centering insert 6 with larger or smaller offset V.

Figure 3:
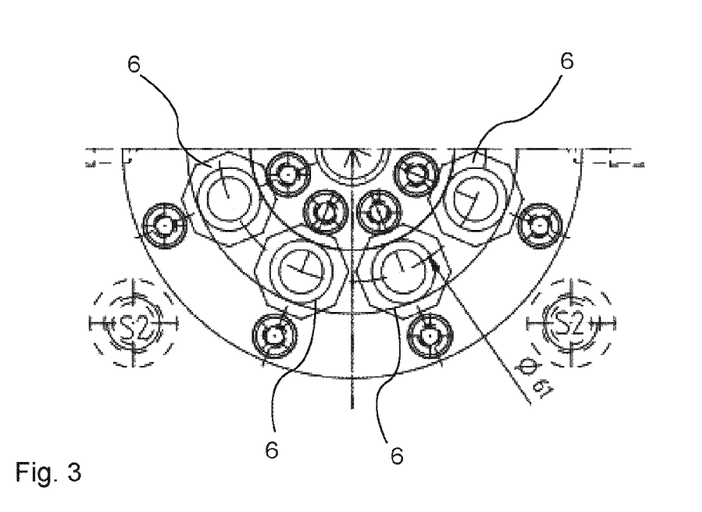
FIG. 3 shows a plurality of centering devices arranged in a circle.

FIG. 3 shows a plurality of centering devices of an injection mold, which are arranged on a circle (only a semicircle is shown) in the illustration shown. The very space-saving and simple configuration of the centering device with a centering insert in the shape of a regular polygon allows a very close packing of cavities for thin-walled, elongated injection-molded articles. In the illustration shown, eight cavities are arranged in the shape of a circle (only a semicircle is shown), which are injection-molded on centrally. In molds of this type, the core must often be arranged slightly eccentrically in the cavity towards the injection point owing to the injection pressure, so that the core comes to lie in its correct central position during the injection process. Such a close packing is possible using the described centering device and the position of each core unit can be set in a simple manner and individually.

Depending on the requirement, the centering unit is formed in one or more regions (A, B, C) of the core unit, as illustrated in FIG. 1. The centering unit can be arranged in the core holding plate 4 at the foot of the core unit 5, in the stripping plate 12 and in the die holding plate 2 in the region of the tip of the core 15.

In the region of the tip of the core 15 (region C), the opening 9 of the centering insert 6 is usually formed as a slightly conical blind hole, into which the tip of the core 15 dips and is held during the closing of the mold. A lateral displacement transverse to the longitudinal direction of the core unit is not possible when the mold is closed and the position of the tip of the core can be set as desired using the correct centering insert 6. The centering insert 6 is held secured against rotation in the centering insert holder 7.

A centering insert of a centering device in the region of the stripping plate (region B, centering unit not illustrated) has a continuous opening, in which the core unit is held in a displaceable manner in its longitudinal direction during the operation of the mold.

A centering insert of a centering device in the region of the core holding plate (region A, centering unit not illustrated) or the foot of the core unit has a continuous opening, in which the core unit is held in a displaceable manner in its longitudinal direction. The core unit is fixed after setting in the core holding plate has taken place.

Figure 4A:
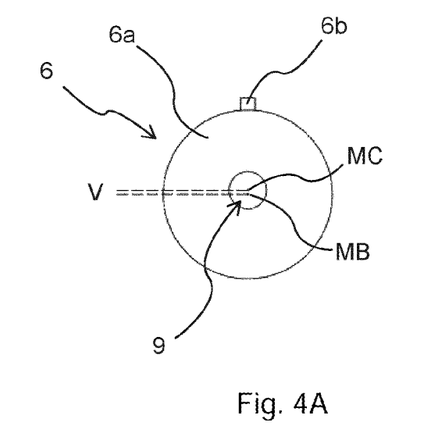
FIGS. 4A-4C show a further variant of a centering device, a plan view onto the end face of the centering insert with pin under FIG. 4A, a sectional illustration of the centering holder under FIG. 4B, a perspective view of the centering insert under FIG. 4C.
Figure 4B:
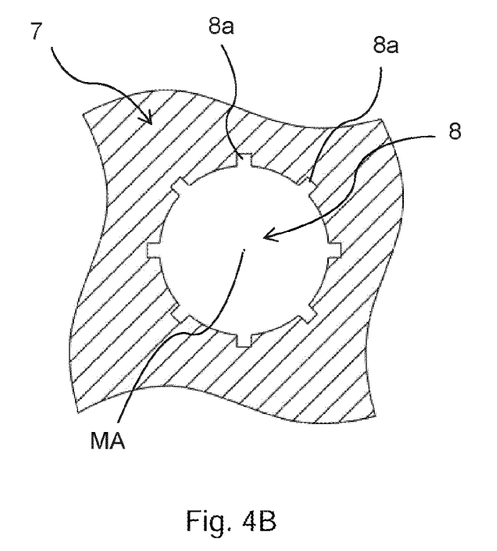
Figure 4C:
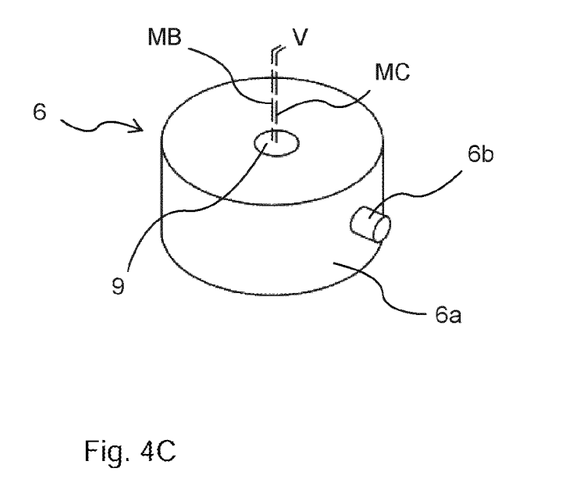

FIGS. 4A to 4C show a further variant of a centering device, the centering insert 6 of which comprises a base body 6a in the shape of a circular cylinder with central axis MB and a projection 6b arranged laterally on the cylindrical surface of the base body 6a. In the embodiment illustrated, the projection 6a is constructed as a pin 6a standing perpendicular to the central axis MB. Furthermore, the centering insert 6 has the opening 9 for mounting the core unit (not illustrated). The central axis MC of the opening 9 is offset by the offset V in the direction of the pin 6a with respect to the central axis MB of the centering insert.

The substantially circular cylindrical recess 8 of the centering insert holder 7, which is complementary to the centering insert 6, has a plurality of slots 8a running in the longitudinal direction for accommodating the projection or pin 6b of the centering insert 6. These slots 8a are arranged rotationally symmetrically around the central axis MA of the recess 8. Eight such slots 8a are shown in the embodiment shown. In the inserted state of the centering insert 6, the same is held in the centering insert holder 7 aligned in the desired direction and secured against rotation using the pin 6b. An additional securing against rotation is not required.

Using the centering device from FIGS. 4A-4C, a core unit can be centered analogously to the previously described 8-gon centering device.

Figure 5:
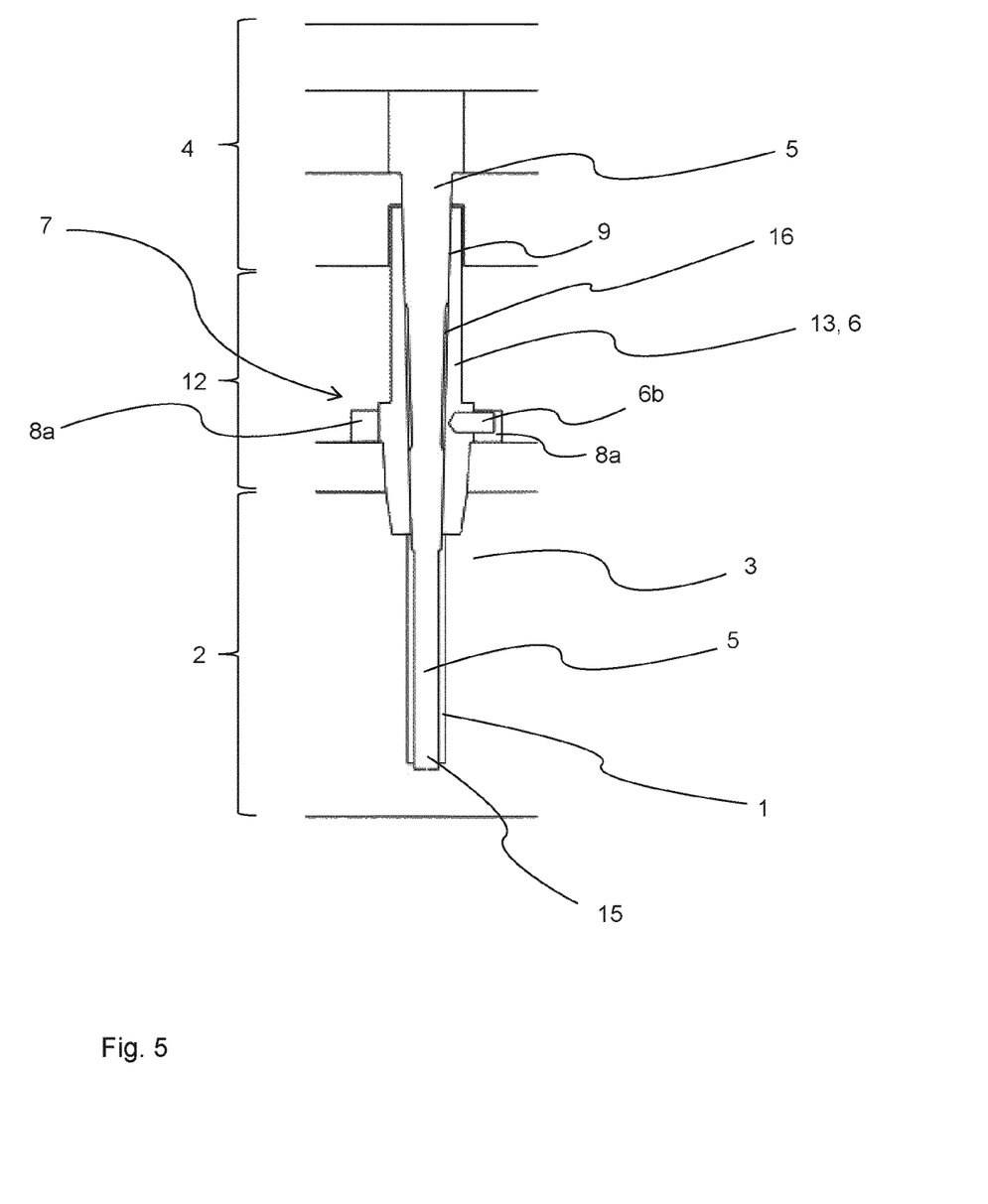
FIG. 5 shows a sectional illustration of a cutout of an injection mold with a stripping element constructed as a centering device.

FIG. 5 shows a sectional illustration of a cutout of an injection mold with centering device, analogously to FIG. 1. The injection mold comprises a die holding plate 2 having at least one cavity-forming die unit 3, a core holding plate 4 having at least one core unit 5, which is introduced into the die unit 3 in the closed state of the mold and forms a cavity 1, and a stripping plate 12, which is arranged between the core holding plate 4 and the die holding plate 2. A stripping element or a stripping ring 13 is arranged in the stripping plate 12. The stripping element 13 is used for ejecting an injection-molded article during the opening of the mold following the injection molding process, in that the stripping plate 12 with the stripping element or the stripping ring 13 is moved forwards relatively to the core unit 5 towards the tip of the core 15.

The stripping element 13 is the centering insert 6 of the centering device at the same time. The stripping plate 12 forms the centering insert holder 7. In the embodiment shown, the centering device is constructed according to the variant of FIGS. 4A-4C. The centering insert 6 has a base body 6a with a pin 6b, which can be brought into the desired rotational position by means of slots 8a in the centering insert holder 7. The opening 9 of the centering insert 6 is formed conically, so that the stripping element 13 or the centering insert 6 can be displaced slightly forwards relatively to the core unit 5. The core unit is correspondingly likewise conically constructed.

The stripping element 13 constructed as centering insert 6 extends substantially over the entire thickness of the stripping plate 12. In this manner, the core unit guided in the opening 9 of the centering insert 6 can be supported and stabilized over a long region or at two regions. The core unit 5 is then correspondingly likewise conically constructed. In order to reduce possible friction and thus wear of the individual parts, the core unit 5 in the design shown has a circumferential taper 16 in a central region of a section, which is held in the opening 9 in the closed mold. There is no contact with the centering unit 5 in this central region in the closed state. The regions adjoining the central region on both sides contact the centering unit 5 however and fix the core unit at the desired position in the closed state of the mold.

The core unit 5 is mounted in the core holding plate 4 in a floating manner in the embodiment shown. When the mold is closed, the core unit 5 is centered and fixed in the correct position by means of the centering insert 6 or the stripping element 13.

LIST OF REFERENCE NUMBERS

1 Cavity
2 Die holding plate
3 Die unit/die
4 Core holding plate
5 Core unit/core
6 Centering insert
6a Base body
6b Projection, pin
7 Centering insert holder
8 Recess
8a Slot
9 Opening
10 Outer contour
11 Inner contour
12 Stripping plate
13 Stripping ring
14 Injection channel
15 Tip of the core
16 Circumferential taper
A, B, C Region of arrangement of a centering device
MA Central axis of the recess 8
MB Central axis of the centering insert 6
MC, MC' Central axis of the opening 9
R Offset direction
V Offset

The invention claimed is:

1. An injection mold with a centering device, the injection mold comprising a die holding plate having a cavity-forming die unit, a core holding plate having a core unit, which is introduced into the die unit in the closed state of the mold, and a stripping plate between the core holding plate and the die holding plate, wherein the centering device comprises a centering insert and a centering insert holder having a recess, which is rotationally symmetrical about a central axis, for mounting of the centering insert; wherein the centering insert has an opening for mounting the core unit; wherein
   the centering insert and the recess of the centering insert holder are configured in such a manner that the centering insert is insertable in the recess of the centering insert holder in a manner secured against rotation in at least three positions that are rotatable about a central axis of the centering insert with the central axis of the recess and the central axis of the centering insert superposed; wherein a central axis of the opening of the centering insert is arranged eccentrically by an offset with respect to the central axis of the centering insert; and wherein the centering device is arranged in the stripping plate.

2. The injection mold according to claim 1, wherein the centering insert is formed by a stripping element mounted in the stripping plate.

3. The injection mold according to claim 1, wherein the core unit is held in the core holding plate in a floating manner.

4. The injection mold according to claim 1, wherein an outer contour of the centering insert has the shape of a regular polygon, wherein an inner contour of the recess of the centering insert holder is constructed to be complementary to the outer contour of the centering insert, and wherein the central axis of the opening of the centering insert is aligned eccentrically by an offset towards the direction of a polygon side or a polygon corner.

5. The injection mold according to claim 4, wherein the regular polygon has three to twelve side surfaces.

6. The injection mold according to claim 1, wherein the centering insert comprises a circular cylindrical base body, on the cylindrical surface of which a projection standing perpendicular to the central axis of the centering insert is arranged;
   and wherein the recess of the centering insert holder has a shape complementary to the base body, which has at least three rotationally symmetrically arranged slots running parallel to the central axis of the recess for accommodating the projection of the centering insert.

7. The injection mold according to claim 6, wherein the central axis of the opening of the centering insert is aligned eccentrically by an offset in the direction towards the projection.

8. The injection mold according to claim 1, wherein the core unit is mountable in the opening in such a manner that a displacement in the longitudinal direction of the core unit is possible.

9. The injection mold according to claim 1, wherein the opening is a through hole or a blind hole or in that the opening is formed cylindrically or conically.

10. The injection mold according to claim 1, wherein the centering insert has a cylindrical shape.

11. The injection mold according to claim 1, wherein the offset is 0.01 mm to 0.1 mm.

12. The injection mold according to claim 1, wherein the injection mold has a plurality of cavities, with each of the plurality having the centering device.

13. The injection mold according to claim 1, wherein a further centering device is arranged in the core holding plate and/or the die unit.

14. The injection mold according to claim 1, wherein the centering insert holder is constructed as a separate part which is mounted in the die unit, the stripping plate and/or the core holding plate.

15. The injection mold according to claim 1, wherein the centering insert holder is formed by the die unit, the stripping plate and/or the core holding plate.

* * * * *